United States Patent
Ekemark et al.

(10) Patent No.: US 8,682,282 B2
(45) Date of Patent: Mar. 25, 2014

(54) METHODS AND DEVICES FOR EMERGENCY NOTIFICATIONS

(75) Inventors: Sven Ekemark, Storvreta (SE); Janne Peisa, Espoo (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/058,496

(22) PCT Filed: Mar. 6, 2009

(86) PCT No.: PCT/SE2009/050233
§ 371 (c)(1), (2), (4) Date: Feb. 10, 2011

(87) PCT Pub. No.: WO2010/019090
PCT Pub. Date: Feb. 18, 2010

(65) Prior Publication Data
US 2011/0136465 A1 Jun. 9, 2011

Related U.S. Application Data (60) Provisional application No. 61/087,863, filed on Aug. 11, 2008.

(51) Int. Cl.
*H04M 11/04* (2006.01)

(52) U.S. Cl.
USPC .................................................. 455/404.1

(58) Field of Classification Search
USPC .................................................. 455/404.1
See application file for complete search history.

(56) References Cited

U.S. PATENT DOCUMENTS

| | | | |
|---|---|---|---|
| 6,449,491 B1 * | 9/2002 | Dailey | 455/518 |
| 6,559,753 B1 | 5/2003 | Uchida | |
| 7,747,239 B1 * | 6/2010 | Sennett et al. | 455/404.1 |
| 2004/0180655 A1 | 9/2004 | Jang et al. | |
| 2005/0064886 A1 * | 3/2005 | Kim et al. | 455/466 |
| 2005/0163074 A1 * | 7/2005 | Mella et al. | 370/329 |

(Continued)

FOREIGN PATENT DOCUMENTS

| | | |
|---|---|---|
| JP | 2001-128206 A | 5/2001 |
| JP | 2007-156766 A | 6/2007 |

(Continued)

OTHER PUBLICATIONS

RAN2: "Reply LS on Earthquake and Tsunami Warning System". 3GPP TSG RAN WG1 Meeting #53bis. R1-082277. Jun. 30-Jul. 4, 2008. Warsaw, Poland.

(Continued)

*Primary Examiner* — Wayne Cai
*Assistant Examiner* — Shantell L Heiber (57) ABSTRACT

Embodiments disclose a method in a communication device in a telecommunications network. The first communication device receives an emergency notification from a broadcasting unit indicating a cell associated to the first communication device wherein the emergency is to be notified to a user equipment. The first communication device determines a paging channel to be used to page and broadcast within the cell a notification indicating an emergency and orders the notification indicating an emergency to be transmitted on the paging channel. The first communication device determines a common control channel to be used to broadcast an emergency confirm message within the cell, and orders the emergency confirm message to be transmitted on the common control channel.

24 Claims, 8 Drawing Sheets

(56) References Cited

U.S. PATENT DOCUMENTS

| | | | |
|---|---|---|---|
| 2005/0195760 A1* | 9/2005 | Lee et al. | 370/312 |
| 2006/0035642 A1* | 2/2006 | Farnsworth et al. | 455/450 |
| 2008/0186923 A1* | 8/2008 | Westphal et al. | 370/332 |
| 2008/0192687 A1* | 8/2008 | Kuo et al. | 370/329 |
| 2008/0194224 A1* | 8/2008 | Thorson et al. | 455/404.1 |
| 2008/0227428 A1* | 9/2008 | Rezaiifar et al. | 455/404.1 |
| 2008/0313698 A1* | 12/2008 | Zhao et al. | 726/1 |
| 2009/0239497 A1* | 9/2009 | Sennett et al. | 455/404.1 |
| 2009/0305712 A1* | 12/2009 | Franceschini et al. | 455/450 |
| 2010/0074192 A1 | 3/2010 | Beming et al. | |

FOREIGN PATENT DOCUMENTS

| | | | |
|---|---|---|---|
| JP | 2008-034915 A | 2/2008 | |
| KR | 2003084859 A | 11/2003 | |
| RU | 52 505 U1 | 11/2005 | |

OTHER PUBLICATIONS

Ericsson: "Details of the ETWS solution". 3GPP TSG-RAN WG2 #62-bis. Tdoc R2-083168. Jun. 30-Jul. 4, 2008. Warsaw, Poland.

NTT DOCOMO Inc: "Proposals for ETWS air interface for Rel-8 EUTRAN". 3GPP TSP RAN WG2 #62. R2-082429. May 5-9, 2008. Kansas City, MO.

3rd Generation Partnership Project; Technical Specification Group Services and System Aspects; Earthquake and Tsunami Warning System Requirements and Solutions (ETWS); Solution Placeholder (Release 8). 3GPP TR 23.828 v0.2.0. (Aug. 2008).

* cited by examiner

METHODS AND DEVICES FOR EMERGENCY NOTIFICATIONS

This application claims the benefit of U.S. Provisional Application No. 61/087,863, filed Aug. 12, 2008, the disclosure of which is fully incorporated herein by reference.

TECHNICAL FIELD

Embodiments herein relate to methods and devices in a telecommunications network, in particular, for sending emergency notifications to user equipment within the telecommunications network.

BACKGROUND

Today there is work ongoing to provide different types of public warnings systems in order to, for example, introduce support for an Earthquake Tsunami Warning System (ETWS), enabling transmission of warning notifications about coming earthquakes and/or tsunamis through mobile stations. The ETWS warning notifications are divided into two types, a primary notification and a secondary notification.

The primary notification is sent in order to notify users about the most urgent event in seconds rather than minutes, such as imminent occurrence of an earthquake and/or the like. There are requirements to reach the users/mobile stations with an ETWS primary notification message within 4 seconds. In order to avoid that fake messages are received causing chaos, inclusion of authentication information in the primary notification will most likely be needed. An alternative to authenticate the information is to have authentication information in the form of a digital signature, e.g. 41 bytes of information if using Digital Signature Algorithm (DSA) signatures and/or the like.

The secondary notification is sent to give the users supplementary information that is of lesser urgency, such as instructions on what to do, where to get help, map to refuge facilities, time table of food distribution, and/or the like.

A Cell Broadcast Service (CBS) based solution has been envisaged for transmission of the ETWS warning notifications, wherein an ETWS message is broadcasted on control channel to all mobile stations within a cell.

Considering ETWS it has been decided that a PAGING message is available in order to satisfy the 'within 4 seconds'-requirement.

The current assumption is to use the PAGING TYPE 1 message for the primary notification, reaching user equipments (UEs) in idle mode and in connected mode that listens to a paging channel. Using the paging channel is considered the main option in order to satisfy the requirement to reach the UEs within 4 seconds. However, there is a desire to reach as many UEs as possible within the time limit with a reliable emergency notification.

SUMMARY

It is an objective of embodiments herein to reach user equipment with emergency message in an efficient and reliable manner.

In some embodiments a method in a first communication device in a telecommunications network is provided. The first communication device receives an emergency notification from a broadcasting unit indicating a cell associated to the first communication device in which the emergency is to be notified to a user equipment. The first communication device further determines a paging channel to be used to page and broadcast within the cell a notification indicating an emergency and orders the notification indicating an emergency to be transmitted on the paging channel. The first communication device also determines a common control channel to be used to broadcast an emergency confirm message within the cell, and orders the emergency confirm message to be transmitted on the common control channel.

In order to perform the method a first communication device is provided.

The first communication device comprises a first network interface arranged to receive an emergency notification from a broadcasting unit over a network and a control unit arranged to determine a paging channel to be used to page and broadcast a notification indicating an emergency when an emergency notification has been received at the network interface. The control unit is further arranged to order the notification indicating an emergency to be transmitted on the paging channel and to determine a common control channel to be used to broadcast an emergency confirm message on. In addition, the control unit is arranged to order the emergency confirm message to be transmitted on the common control channel.

Embodiments herein also disclose a method in a user equipment arranged to listen to a paging channel within a telecommunications network for receiving an emergency confirm message. The user equipment receives a notification indicating an emergency broadcasted on the paging channel, and, as a result of receiving the notification listens to a common control channel. The user equipment then receives the emergency confirm message on the common control channel.

In order to perform the method a user equipment is provided.

The user equipment comprises a receiving arrangement adapted to receive a notification indicating an emergency broadcasted on a paging channel and a control unit arranged to read the notification and to determine that the notification indicates an emergency. The control unit is further arranged to switch operation of the receiving arrangement to enable the receiving arrangement to listen and receive an emergency confirm message on a common control channel when the notification indicates an emergency.

Furthermore, a system in a telecommunications network is provided. The system comprises an arrangement adapted to use a PAGING TYPE 1 message including an Earthquake Tsunami Warning System primary notification on paging control channel to trigger a behaviour of a user equipment. The behaviour implies that the user equipment is arranged to start receiving messages on common control channel during a predefined period of time when it has received the Earthquake Tsunami Warning System primary notification in the PAGING TYPE 1 message.

Embodiments herein provide a way to reach UEs with authentication information in a fast and reliable manner. By using the paging channel for a notification and a trigger for reached UEs to change to a common control channel carrying the notification and authentication information, the amount of UEs that are reached is increased as well as the notification is authenticated in a fast manner.

BRIEF DESCRIPTION OF THE DRAWINGS

Embodiments will now be described in more detail in relation to the enclosed drawings, in which.

DETAILED DESCRIPTION

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Figure 1:
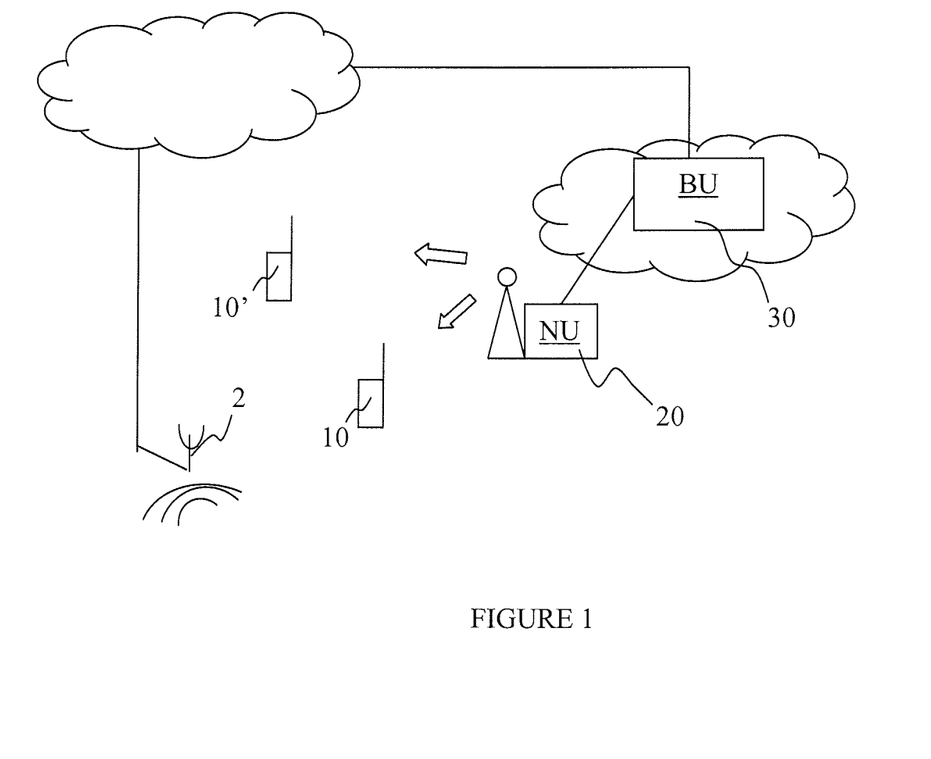
FIG. 1 shows a schematic example for transmitting an emergency notification within a communications network.

FIG. 1 discloses a schematic embodiment for transmitting an emergency notification within a communications network. A detector 2 registers an emergency situation such as an earthquake and/or the like. The detector registration is registered at, for example, a central government agency that determines that an emergency notification should be transmitted to UEs within an affected area. An order is sent to a broadcasting unit (BU) 30 to transmit an emergency notification to UEs within the affected area. The order may be manually input/sent to the BU 30 and/or the like.

The BU 30 transmits an emergency notification to a first communication device (Network Unit) NU 20 controlling a cell within the affected area. The NU 20 may be an enhanced NodeB (eNB), Radio Network Controller (RNC), Base Station Controller (BSC), and or the like. The NU 20 determines a paging channel to transmit an emergency notification on and orders the transmission of the emergency notification on the paging channel. The NU 20 then determines a common control channel carrying an emergency confirmation and orders the transmission of the emergency confirmation on the common control channel. The NU 20 may also send an emergency confirmation on a dedicated channel to UEs connected on a dedicated channel to the network.

In the illustrated example, a first UE 10 is in a mode wherein the UE 10 is listening to a paging channel within the cell of the affected area. The emergency notification is received at the UE 10. The received emergency notification triggers the UE 10 to start listening to the common control channel, that is, the UE temporarily suspends Discontinuous Reception operation and receives messages on the common control channel. The UE 10 receives the emergency confirmation on the common control channel by listening to the common control channel. The UE 10 confirms the authenticity of the emergency confirmation by reading security information within the emergency confirmation. Security information may, for example, be DSA and/or the like.

A second UE 10' being in a second mode wherein the UE 10' is connected on a common control channel not listening to the paging channel, is also within the cell of the NU 20. The UE 10' does not receive the emergency notification on the paging channel but receives the emergency confirmation broadcasted on the common control channel.

It should be noted that the orders of transmission are sent to a base station serving the cell wherein the NU 20 comprises a controller node, for example, a RNC, a BSC and/or the like. Alternatively, the orders of transmission are transmitted within the NU 20 to elements arranged to serve and broadcast within the cell wherein the NU 20 comprises a base station, for example, an eNB.

Figure 2:
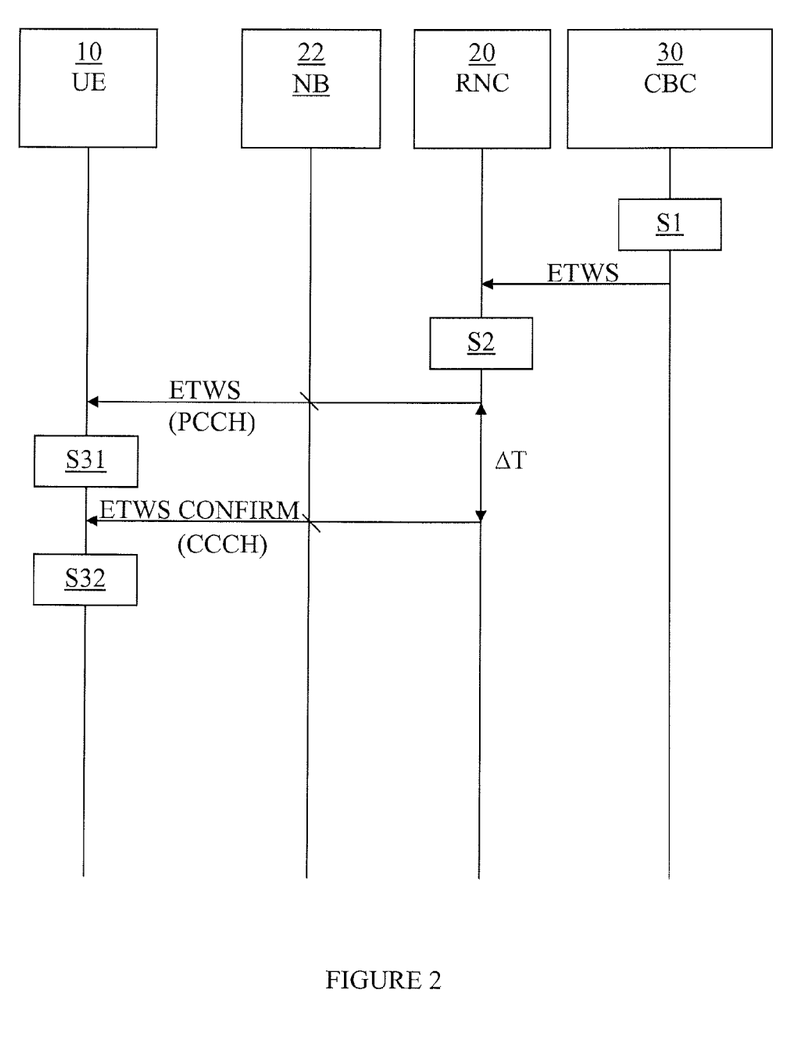
FIG. 2 shows a schematic combined method and signalling scheme in an Universal Mobile Telecommunications System, UMTS.

FIG. 2 discloses a schematic combined method and signalling scheme in a Universal Mobile Telecommunications System (UMTS).

In step S1, a broadcasting unit, being a cell broadcast centre (CBC) 30, determines that an emergency notification should be broadcasted to UEs within an affected area of the emergency situation. The CBC 30 transmits the emergency notification being illustrated as an Earthquake/Tsunami Warning System (ETWS) message to a Radio Network Controller (RNC) 20 controlling a cell within the affected area.

In step S2, the RNC 20 receives the ETWS message and determines a paging channel to transmit the emergency notification on and a common control channel (CCCH) to transmit an emergency confirmation message, ETWS CONFIRM, on. The ETWS CONFIRM message comprises the ETWS message and security information used to authenticate the ETWS message.

In the illustrated example, the paging channel comprises a Paging Control Channel (PCCH).

The RNC 20 then transmits an order/command to a base station NB 22 serving the cell, ordering a NB 22 to broadcast the ETWS message on the PCCH and the NB 22 broadcasts the ETWS message on the PCCH.

The RNC 20 also transmits an order/command to the NB 22 serving the cell, ordering the NB 22 to broadcast the ETWS CONFIRM message on the CCCH and the NB 22 broadcasts the ETWS CONFIRM message on the CCCH.

The ETWS message and the ETWS CONFIRM message may be transmitted simultaneously or as indicated in FIG. 2 with a time delay Δt.

In the UMTS Terrestrial Radio Access Network (UTRAN) of UMTS a user equipment (UE) may be in one of several Radio Resource Control (RRC) states depending on the user activity. These states comprise Idle Mode, URA PCH-state, CELL PCH-state, CELL FACH-state and CELL DCH-state, listed in order of increasing user activity.

URA PCH state—Utran Registration Area Paging Channel state where the RNC knows that the UE is camped on a cell within an area comprising a number of cells.

Cell PCH state—Cell Paging Channel-state wherein the RNC knows which cell the UE is camped on.

In Cell PCH and URA PCH-state, no communication is possible and minimum radio and battery resources are consumed. When the UE has data to send, it needs to transmit a Cell Update message to the UTRAN, indicating that uplink data is available. When UTRAN has data to send to a UE in CELL PCH or URA PCH it needs to send a paging message to the UE, and the UE responds with a Cell Update message to indicate in which cell it is located.

Cell FACH state—Cell Forward link Access Channel wherein the UE is continuously connected through CCCH and shares the radio resource with other UEs.

In CELL FACH state, communication is possible but with low data rate and high round trip time due to the properties of the shared channel. A UE in this state consumes more radio resources compared to CELL_PCH/URA_PCH but fewer resources than compared to CELL_DCH.

Cell DCH state—In Cell Dedicated Channel state the UE has a dedicated channel available which implies that communication with high data rate and low round trip time is possible.

In order to have a sufficient probability to reach all UEs in idle mode and in the CELL/URA_PCH states, paging messages are sent in the paging occasions for all the UEs, independent of a Discontinuous Receiving (DRX) scheme. In typical cell configurations, the Paging Channel (PCH) and Forward link Access Channel (FACH) transport channels share the same Secondary Common Control Physical Channel (S-CCPCH) which means that continuous paging (via PCH) risk to cause starvation of the FACH transport channel.

Security information for integrity protection may be sent to all UEs, in order to verify the primary notification. It is essential that this is done as soon as possible, ideally within the 4 seconds delay allowed for the primary notification (PAGING TYPE 1). Otherwise, either the warning to the end user would be delayed, or the warning has to be issued prior to the verification of the information has been perform, with a risk of false (fraudulent) alarm as a result.

In order to reach all the UEs in idle mode and in URA/CELL_FACH state on PCCH, a PAGING TYPE 1 (at least one) is sent in a paging occasion given by any possible UE DRX pattern.

In step S31, a UE 10 being in Idle Mode, URA PCH-state, and/or CELL PCH-state listening on the PCCH receives and determines that the message comprises an ETWS message. The determination that the UE 10 has received an ETWS message triggers the UE 10 to listen to the CCCH.

In step S32, the UE 10 listens and receives the ETWS CONFIRM message on the CCCH. The UE 10 then verifies the ETWS message by verifying the security information in the ETWS CONFIRM message and displays emergency information to the user of the UE 10.

It should be noted, that the UE 10 monitors the paging channel PCH once in every DRX cycle. The offset within the DRX cycle is based on the International Mobile Subscriber Identity, IMSI, of the UE 10. Hence, in order to satisfy the requirement of a time limit of 4 seconds, at least one PAGING TYPE 1 message has to be sent for each Transmission Time Interval TTI within the maximum DRX cycle used in the network. This is to be performed within the required maximum delay of 4 seconds.

The length of the DRX cycles is controlled by the Radio Access Network (RAN) and typical values are 1.28 and 2.56 seconds. DRX cycles indicate the relation between sleep mode and awake mode.

Embodiments are disclosed wherein normal operations is not restricted when an ETWS notification is transmitted since both rescue personnel and the public are likely to require services from the network during an emergency. Consequently, those services must not be blocked. For that reason, it is not possible to send a paging message in every TTI on Paging Control Channel (PCCH) because PCCH typically share a same Secondary Common Control Physical Channel (S-CCPCH) as FACH uses for signalling in CELL_FACH state. If every Time Transmission Interval (TTI) is used for PCCH, it would cause starvation on FACH, which would, at least temporarily, block other services in the network. TTI is defined as the inter-arrival time of Transport Block Set, and is equal to the periodicity at which a Transport Block Set is transferred by the physical layer on the radio interface. It is always a multiple of the minimum interleaving period, e.g. 10 ms, the length of one Radio Frame.

If the DRX cycles are not too long, it would however be possible to use, for instance, every third TTI on PCCH. That would consume ⅓ of the capacity of the S-CCPCH. The available capacity for FACH would thus be reduced, but not completely blocked. If the S-CCPCH is dimensioned with some margin, other services would thus not be restricted in any significant way. If the maximum DRX cycle is 1.28 seconds, it would still allow at least one PAGING TYPE 1 message to all UEs in idle mode and URA/CELL_FACH state within the stipulated maximum delay of 4 seconds.

For example, if the DRX cycle providing paging intervals for each IMSI is 1.28 seconds the cycle will be repeated thrice within the requirement of 4 seconds and hence the ETWS message may be sent on every third TTI. If the DRX cycle is 0.64 seconds, the cycle will be repeated six times and the ETWS message may be sent every sixth TTI. If, however, a DRX cycle of 2.56 seconds is used the DRX cycle is not repeated completely within the four seconds requirement. The ETWS message may in this case be sent in two out of three TTI.

Obviously, other sophisticated schemes may be used for the scheduling of these messages. There is an apparent trade off between providing TTIs for the ETWS primary notifications and for the signalling on FACH, and the requirement to schedule primary notification messages such that they can be received within the stipulated maximum delay by all UEs.

If approximately ⅓ of the S-CCPCH capacity is used for ETWS primary notification, and provided that the maximum DRX cycle for paging is not greater than 1.28 seconds, it is possible to reach all UEs in idle mode and in URA/CELL_PCH state with the PAGING TYPE 1 message used for the primary notification within the required maximum delay of 4 seconds.

The security information associated with the primary notification transmitted to the UEs, may be around 50 octets. It is not possible to send that much information in one S-CCPCH transport block, using typical cell configurations, and there is no segmentation on PCCH.

However, it is possible to have segmentation on CCCH. Thus, embodiments disclose a way of using the PAGING TYPE 1 message on PCCH to trigger a behaviour of the UE where it starts receiving messages on CCCH during a predefined period of time when it has received the ETWS primary notification in the PAGING TYPE 1 message. A new RRC message is provided to be sent on CCCH here called FFS or as the ETWS CONFIRM message and comprises ETWS PRIMARY NOTIFICATION WITH SECURITY.

The behaviour foreseen by the UEs in idle mode and in URA/CELL_PCH is that when a PAGING TYPE 1 message is received, including the ETWS primary notification, the UEs temporarily suspend the DRX operation and start to receive messages on CCCH until either the ETWS CONFIRM message is received, or the predefined period of time where the UE receives CCCH ends. If the period ends before an ETWS CONFIRM message is received, the UE should regard this as a false alarm and ignore it. However, if another PAGING TYPE 1 message including the ETWS primary notification is received, the UE may restart the procedure.

The network should schedule the ETWS CONFIRM message on CCCH as frequent as required in order to ensure that the UEs may receive it during the period of time they receive the CCCH messages, for example, four times per second and/or the like. The message may be sent using Radio Link Control Unacknowledged Mode, RLC-UM. A UE timer with a value in the order of a few seconds could be used to determine the length of this period. It is proposed to use a predefined value, for example, not configurable. If a value of two seconds is used, the ETWS CONFIRM message is scheduled at least once every two seconds on CCCH.

The ETWS CONFIRM message shall contain the security information used for integrity protection of the ETWS primary notification. In fact, it is proposed that the ETWS CONFIRM message is self contained and includes all the information required for the primary notification. In this way, the PAGING TYPE 1 message merely serves as the trigger for the primary notification. This trigger may just be a binary indication in the PAGING TYPE 1 message; it may include a value indicating the cause of the ETWS alarm, comprising ETWS information, and/or the like.

A self contained ETWS CONFIRM message implies that the integrity of the ETWS primary notification can be verified on the basis of a single Radio Resource Control Packet Data Unit, RRC PDU. If contents from the PAGING TYPE 1 message were taken into account in the verification, the procedure becomes more complex and prone to errors.

If the message is self contained, it may easily be reused for the primary notification of UEs in CELL_FACH and CELL_DCH state. Those UEs do not receive the PAGING TYPE 1 message and must not depend on the PAGING TYPE 1 message for the reception of the ETWS primary notification.

In some embodiments, UEs in CELL_FACH state and in CELL_DCH state should also be reachable by the primary notification. Those UEs do not receive the PAGING TYPE 1 messages on PCCH.

Figure 3:
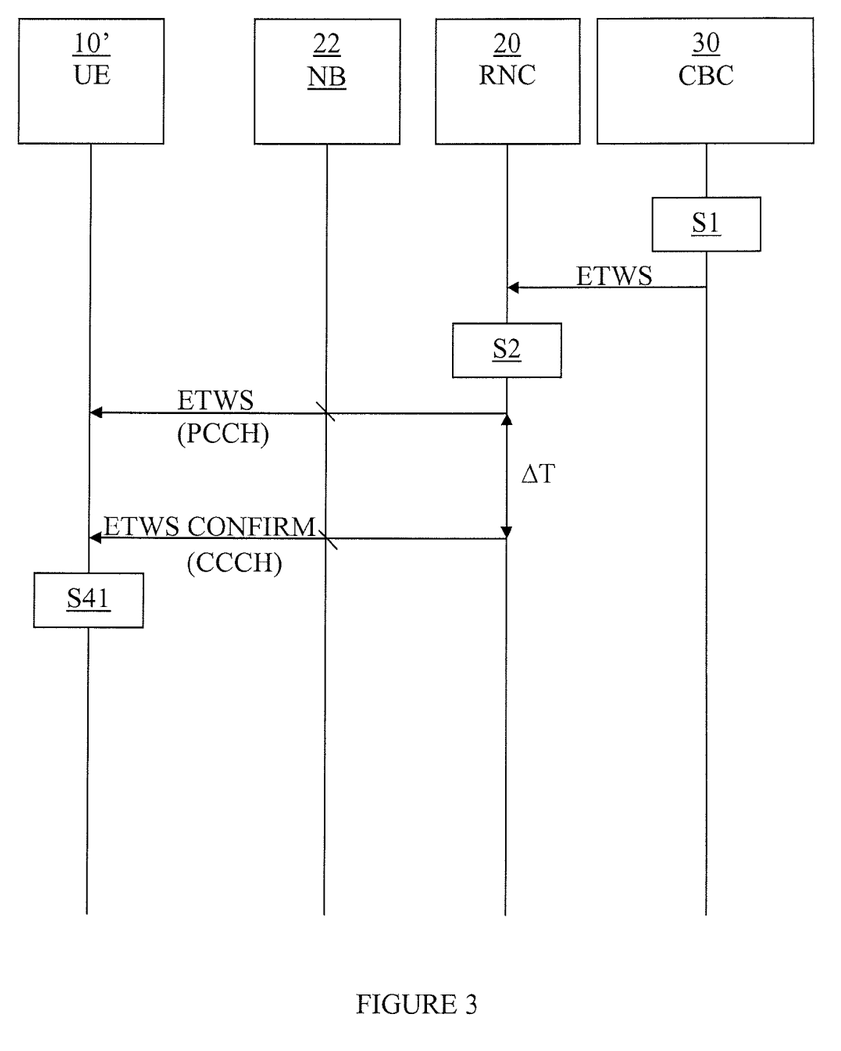
FIG. 3 shows a schematic combined method and signalling scheme in a UMTS network.

FIG. 3 discloses a schematic combined method and signalling scheme in a Universal Mobile Telecommunications System (UMTS).

In step S1, a cell broadcast centre (CBC) 30 determines that an emergency notification, ETWS message, should be broadcasted to UEs within an affected area of the emergency situation. The CBC 30 transmits the ETWS message to a Radio Network Controller (RNC) 20 serving a cell within the affected area.

In step S2, the RNC 20 receives the ETWS message and determines a paging channel to transmit the emergency notification ETWS on and a common control channel CCCH not used for paging to transmit an emergency confirmation message, ETWS CONFIRM, on.

The ETWS CONFIRM message may comprise the ETWS message and ETWS security information.

In the illustrated example, the paging channel comprises a Paging Control Channel (PCCH).

The RNC 20 then transmits an order/command to a base station NB 22 serving the cell, ordering the NB 22 to broadcast the ETWS message on the PCCH and the NB 22 broadcasts the ETWS message on the PCCH.

The RNC 20 also transmits an order/command to the NB 22 serving the cell, ordering the NB 22 to broadcast the ETWS CONFIRM message on the CCCH and the NB 22 broadcasts the ETWS CONFIRM message on the CCCH.

The ETWS message and the ETWS CONFIRM message may be transmitted simultaneously or as indicated in FIG. 3 with a time delay $\Delta t$.

In the illustrated example of FIG. 3, a UE 10' is in a connected state not listening to the paging channel PCCH, such as CELL_FACH state and/or the like. Hence, the UE 10' does not detect the ETWS message on the PPCH.

In step S41, the UE 10' receives and reads the ETWS CONFIRM message broadcasted on the CCCH, wherein the UE 10' is connected on the CCCH. The ETWS information contained in the ETWS CONFIRM message is verified by analysing the ETWS security information. If the ETWS information is verified/confirmed to be authentic an emergency message may be displayed on the UE 10'.

Figure 4:
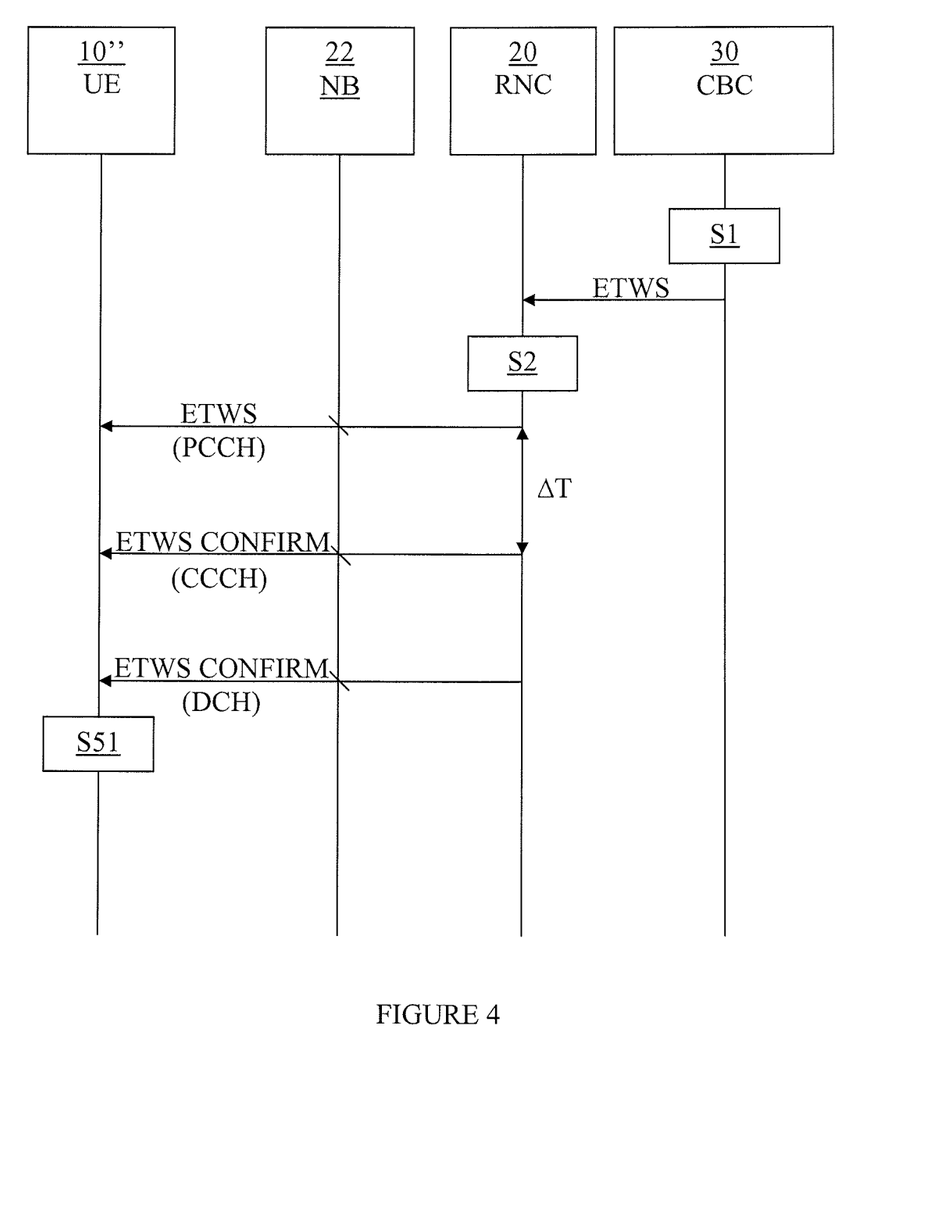
FIG. 4 shows a schematic combined method and signalling scheme in a UMTS network.

FIG. 4 discloses a schematic combined method and signalling scheme in a Universal Mobile Telecommunications System (UMTS).

In step S1, a CBC 30 determines that an emergency notification message should be broadcasted to UEs within an affected area of the emergency situation. The CBC 30 transmits an ETWS message to a RNC 20 serving a cell within the affected area.

In step S2, the RNC 20 receives the ETWS message and determines a paging channel to transmit the emergency notification on and a common control channel CCCH not used for paging to transmit an emergency confirmation message, ETWS CONFIRM, on. The ETWS CONFIRM message may comprise the ETWS information and ETWS security information.

In the illustrated example, the paging channel comprises a Paging Control Channel (PCCH).

The RNC 20 then transmits an order/command to a base station NB 22 serving the cell, ordering the NB 22 to broadcast the ETWS message on the PCCH and the NB 22 broadcasts the ETWS message on the PCCH.

The RNC 20 also transmits an order/command to the NB 22 serving the cell, ordering the NB 22 to broadcast the ETWS CONFIRM message on the CCCH and the NB 22 broadcasts the ETWS CONFIRM message on the CCCH.

The ETWS message and the ETWS CONFIRM message may be transmitted simultaneously or as indicated in FIG. 4 with a time delay $\Delta t$.

A UE 10" within the cell is in a connected state on a dedicated channel (DCH). Hence, the UE 10" does not detect the ETWS message on the PCCH nor does the UE 10" detect the ETWS CONFIRM message on the CCCH. In the illustrated example, the DCH comprises a dedicated control channel (DCCH).

In order to reach UEs connected on DCCHs the RNC 20 transmits an order/command to the NB 22 serving the cell, ordering the NB 22 to transmit the ETWS CONFIRM message on the DCCH of the UE 10" and the NB 22 transmits the ETWS CONFIRM message on the DCCH to the UE 10". The RNC 20 comprises information of UEs connected on DCHs.

In step S51, the UE 10" receives the ETWS CONFIRM message on the DCCH and decodes/reads the ETWS CONFIRM message and retrieves the ETWS information and the ETWS warning security information. The UE 10" then verifies the ETWS information by analysing the ETWS warning security information and if the ETVVS information is verified the UE 10" may display an emergency message on the UE 10".

The ETWS Security Information comprises a core network information element, which may contain both a time stamp of the ETWS warning and a digital signature. As this is core network information, the information may be conveyed to the UE, whenever the ETWS security is required.

The displayed emergency message may be the ETWS information and/or a separate message created/predefined in the UE.

Referring back to the paging message, the paging message includes a trigger for the ETWS primary notification. The trigger may include a value indicating the cause of the ETWS primary notification. If the trigger is received by a UE in idle mode or URA/CELL_PCH state, and the cause value is one the UE is configured to respond to, the UE temporarily suspends the DRX operation and receive messages on CCCH during a predefined period of time. A time period of 2 seconds is proposed. The trigger may be that the paging type 1 comprises ETWS information.

In some embodiments, a new radio resource control (RRC) message (tentatively: ETWS CONFIRM message) is defined to convey the security information for integrity protection of the ETWS primary notification. The message is self contained and includes all the information required for the primary notification, i.e., the cause of the primary notification and the required security information and/or more. The message is sent on CCCH during the period when the UEs in idle mode or URA/CELL_PCH state receive messages on CCCH. The message may be sent, for example, during six seconds from that the first paging message is sent.

The precise scheduling of the PAGING TYPE 1 message on PCCH and the ETWS CONFIRM message on CCCH depends on the network implementation. It is the responsibility of the network to schedule those messages such that the maximum delay requirement of the primary notification is satisfied. For example, the PAGING TYPE 1 is transmitted on every third TTI and the ETWS CONFIRM may be transmitted correspondingly. The PAGING TYPE 1 message and the ETWS confirm message may be transmitted simultaneously, with a small delay in between, and/or the like A benefit of making the ETWS CONFIRM message self contained is that it may be used for the primary notification of UEs in CELL_FACH and CELL_DCH states.

There is no requirement for a UE in CELL_FACH state to receive and analyse messages received via PCCH, therefore, those UEs do not trigger on the PAGING TYPE 1 message. However, those UEs will receive messages on CCCH. When received, the UEs in CELL_FACH state consider the ETWS CONFIRM message as the ETWS primary notification.

It is assumed that the ETWS CONFIRM message is repeated several times on CCCH during primary notification. The network shall ensure that the message can be received by all UEs in CELL_FACH state (with FACH assigned as the transport channel for CCCH), taking for instance the need for measurement gaps into account.

Regarding the UEs in CELL_DCH state, those UEs do not receive messages on PCCH nor CCCH. The ETWS CONFIRM message may be sent on DCCH to these UEs. It implies that separate messages need to be sent to each one of these UEs. However, there are a finite number of these UEs within a certain area; sending a message to each one of them is possible.

UEs in CELL_FACH state may in some embodiments be assigned HS-DSCH as the transport channel for CCCH, which implies that they will not receive messages on CCCH scheduled via FACH. A similar method may be developed for these UEs.

Another potential issue is UEs changing state during the primary notification and the UE looses messages transmitted from the network on PCCH and CCCH. This is an obstacle that may cause additional delay before the primary notification is received by the UE. However, the assumption is that the network continues to send the primary notification messages also after the initial 4 seconds, which is the intended maximum delay. In an emergency situation, it is important to capture also UEs that might be temporarily out of coverage, etc. The network may then continue to send the primary notification and that this is sufficient in order to capture the UEs that might loose messages on PCCH and/or CCCH due to state transitions or lack of coverage.

Conclusively, UEs being in CELL_FACH state (and assigned FACH as the transport channel for CCCH) will receive the ETWS CONFIRM message when it is sent on CCCH and use that as the ETWS primary notification.

The UEs in CELL_DCH state receives the ETWS CONFIRM message when it is sent on DCCH and uses that as the ETWS primary notification.

It is possible to reach all UEs in idle mode and in URA/CELL_PCH state with the PAGING TYPE 1 message used for the primary notification within the required maximum delay of 4 seconds, if approximately ⅓ of the S-CCPCH capacity is used for this purpose, and provided that the maximum DRX cycle for paging is not greater than 1.28 seconds. It should here be understood that if the DRX cycle is smaller, for example, 0.64 seconds, approximately ⅙ of the S-CCPCH capacity may be used for this purpose and still all UEs will be reached within the required maximum delay of 4 seconds. Hence, the smaller the DRX cycle is the less capacity is needed to reach all the UEs within the 4 second limit.

In some embodiments, UEs in CELL_FACH mode are assigned a High Speed Downlink Shared Channel HS-DSCH as the transport channel for CCCH (enhanced CELL_FACH), whereas the ETWS notification is sent thereon.

Figure 5:
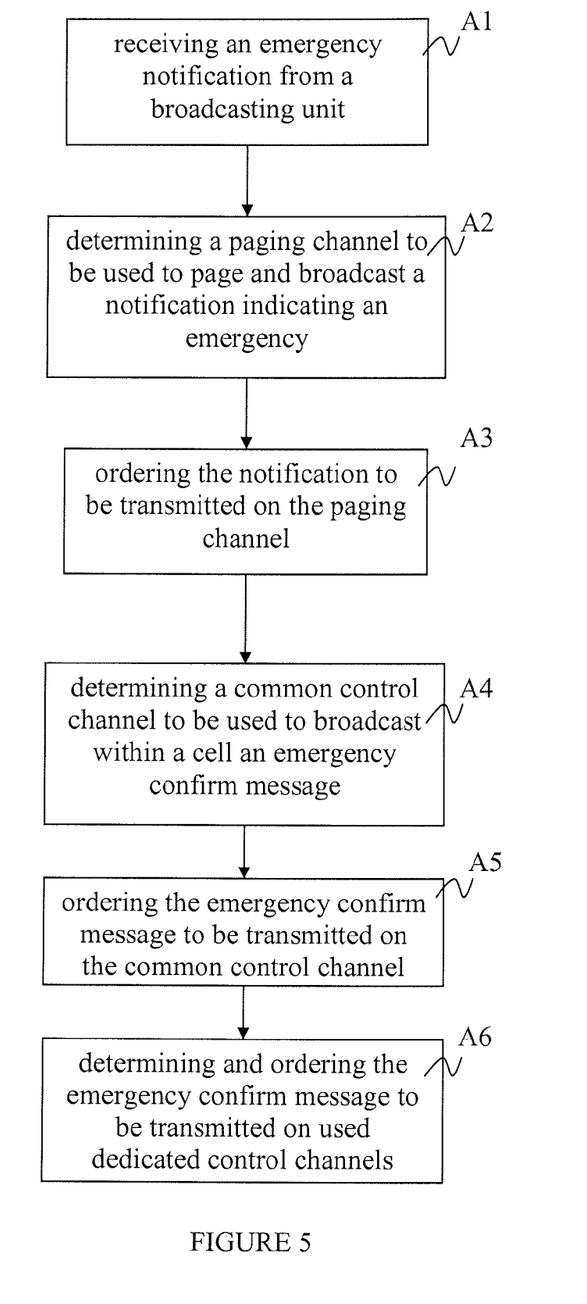
FIG. 5 shows a schematic overview of a method in a first communication device.

In FIG. 5 a schematic overview of a method in a first communication device is shown.

In step A1, the first communication device receives an emergency notification from a broadcasting unit. The broadcasting unit may be a CBC and/or the like. The emergency notification indicates a cell associated to the first communication device within which the emergency notification should be broadcasted. The cell may be indicated with a cell ID, a location area and/or the like.

In step A2, the first communication device determines a paging channel to be used to page and broadcast within the cell associated to the first communication device a notification indicating an emergency. The notification may be the emergency notification received from the broadcasting unit and/or a separate message. The paging channel may be a paging control channel, PCCH, and/or the like.

In step A3, the first communication device orders the notification indicating an emergency to be transmitted on the paging channel (a paging operation to be performed).

In step A4, the first communication device determines a common control channel to be used to broadcast within the cell associated to the first communication device an emergency confirm message. The emergency confirm message may be self contained comprising ETWS information and ETWS security information.

In step A5, the first communication device orders the emergency confirm message to be transmitted on the common control channel. The emergency confirm message may be ordered to be transmitted repeatedly on the Common Control Channel (CCCH).

It should here be understood that the steps A2-A5 are shown as blocks in succession but may in fact be executed substantially concurrently or the blocks may sometimes be executed in the reverse order.

In optional step A6, the first communication device determines a dedicated channel used by a user equipment being connected over the dedicated channel, and orders the emergency confirm message to be transmitted on the dedicated channel. The first communication device has knowledge of UEs connected on dedicated channels and analyses this information to determine which dedicated channels to transmit the emergency confirm message on.

In some embodiments, the operation of paging the notification indicating an emergency is ordered to merely be performed using a range of 10-70% of a total Secondary Common Control Physical Channel (S-CCPCH) capacity, and that a Discontinuous Receiving (DRX) cycle of the cell comprises a time cycle in a range from 0.5 to 2.56 seconds.

In some embodiments, the emergency confirm message comprises Earthquake and Tsunami Warning System information indicating an emergency, and Earthquake and Tsunami Warning System security information. In some embodiments, the notification comprises a value indicating that the notification concerns an emergency, such as an Earthquake and Tsunami Warning System primary notification information.

In some embodiments, the first communication device comprises a controller node such as a RNC and transmits the order to a base station, wherein the base station follows the order and transmits the notification indicating an emergency on the paging channel and the emergency confirm message on the common control channel In some embodiments, the first communication device comprises a controller function and a base station such as an eNB and sets up bearers within the cell and transmits the notification indicating an emergency on the paging channel and the emergency confirm message on the common control channel.

In order to perform the method a first communication device is provided.

Figure 6:
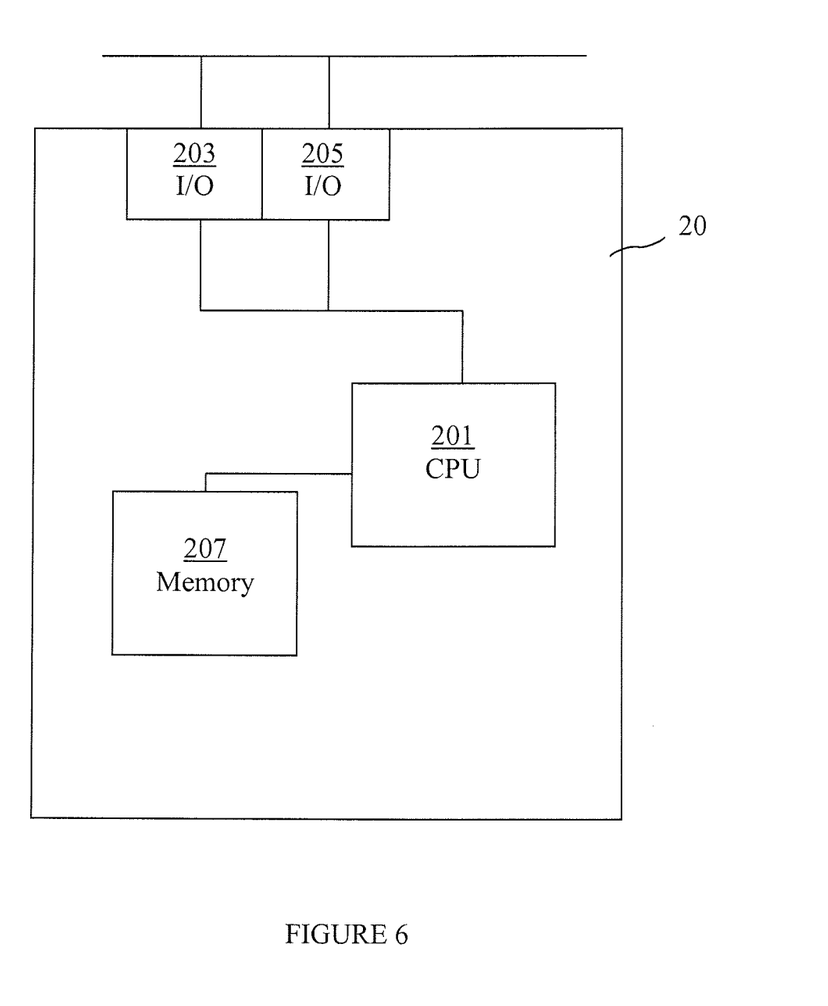
FIG. 6 shows a schematic overview of a first communication device.

In FIG. 6, a schematic overview of a first communication device is shown. The first communication device may comprise a controller node such as a Radio Network Controller, Base Station Controller, and/or the like. In some embodiments, the first communication device comprises a base station with a functionality to control and allocate radio bearers within a cell, such as enhanced NodeB and/or the like.

The first communication device 20 comprises a first network interface 203 arranged to receive an emergency notification from a broadcasting unit. The broadcasting unit may be a CBC and/or the like. The emergency notification indicates a cell associated to the first communication device within which the emergency notification should be broadcasted.

Furthermore, the first communication device comprises a control unit 201 arranged to determine a paging channel to be used to page and broadcast a notification indicating an emergency when an emergency notification has been received at the network interface 203. The control unit 201 is further arranged to order the notification indicating an emergency to be transmitted on the paging channel. Additionally, the control unit 201 is arranged to determine a common control channel to be used to broadcast an emergency confirm message, and to order the emergency confirm message to be transmitted on the common control channel (CCCH).

The control unit 201 may further be arranged to order the emergency confirm message to be transmitted repeatedly on the Common Control Channel. The emergency confirm message comprises a Radio Resource Control emergency message.

In some embodiments, the control unit 201 is further arranged to determine a dedicated channel used by a user equipment being connected over the dedicated channel, and to order the emergency confirm message to be transmitted on the dedicated channel. The first communication device has knowledge of UEs connected on dedicated channels and uses this information retrieved from a memory 207 of the first communication device 20.

In some embodiments, the paging operation of the notification indicating an emergency is ordered to merely be transmitted using a range of 10-70% of a total Secondary Common Control Physical Channel (S-CCPCH) capacity, and that a Discontinuous Receiving (DRX) cycle of the cell comprises a time cycle in a range from 0.5 to 2.56 seconds.

In some embodiments, the emergency confirm message comprises Earthquake and Tsunami Warning System information indicating an emergency, and Earthquake and Tsunami Warning System security information. In some embodiments, the notification comprises a value indicating that the notification concerns an emergency, such as an Earthquake and Tsunami Warning System primary notification information.

In some embodiments, the first communication device 20 comprises a controller node such as a RNC and further comprises a second network interface 205 arranged to be used to transmit the order to a base station, wherein the base station follows the order and transmits the notification indicating an emergency on the paging channel and the emergency confirm message on the common control channel In some embodiments, the first communication device 20 comprises a controller function and a base station such as an eNB and the control unit 201 is arranged to set up bearers within the cell and transmits the notification indicating an emergency on the paging channel and the emergency confirm message on the common control channel over a wireless arrangement such as an antenna arrangement or the like.

Figure 7:
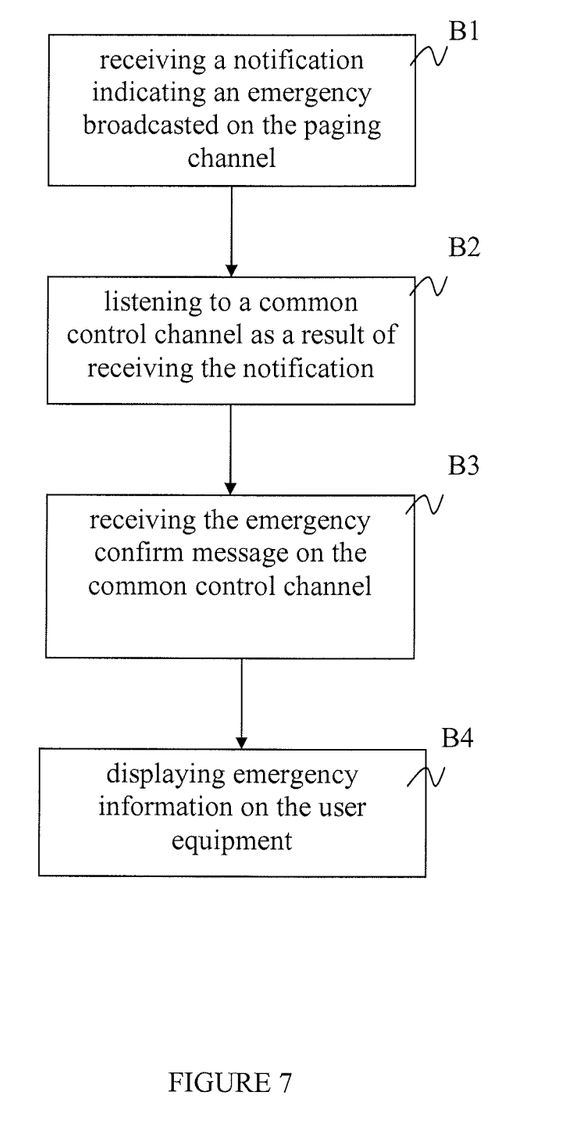
FIG. 7 shows a schematic overview of a method in a user equipment.

In FIG. 7, a method in a user equipment arranged to listen to a paging channel within a telecommunications network for receiving an emergency confirm message is shown. The user equipment may be in an idle mode, a Cell PCH and URA PCH-state, and/or the like.

In step B1, the user equipment receives a notification indicating an emergency broadcasted on the paging channel.

In step B2, the user equipment listens to a common control channel as a result of receiving the notification. That is, the Discontinuous Reception (DRX) is temporarily suspended in the user equipment and enabled to receive messages on the common control channel, for example, during a predefined period of time.

In step B3, the user equipment receives the emergency confirm message on the common control channel.

In some embodiments, the emergency confirm message comprises security information and the method further comprises to authenticate the emergency confirm message by reading the security information within the emergency confirm message.

In optional step B4, the user equipment displays emergency information on the user equipment.

In order to perform the method a user equipment is provided.

Figure 8:
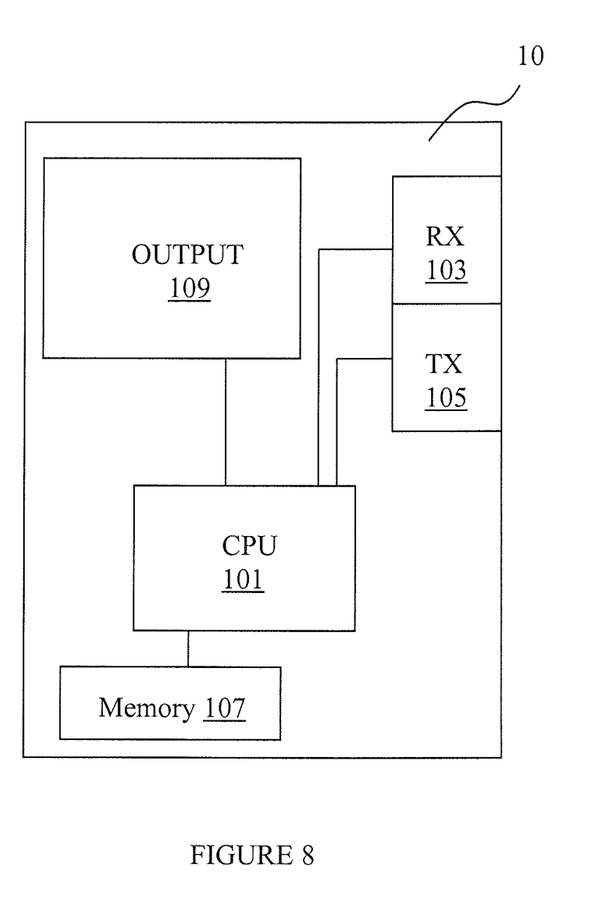
FIG. 8 shows a schematic overview of a user equipment.

In FIG. 8, a schematic overview of a User Equipment is shown. The user equipment comprises a receiving arrangement 103 arranged to receive a notification indicating an emergency broadcasted on a paging channel, for example, PCCH and/or the like. The user equipment furthermore comprises a control unit 101 arranged to read the notification and to determine that the notification indicates an emergency. In that case, the control unit 101 is arranged to switch operation of the receiving arrangement 103 to enable the receiving arrangement 103 to listen and receive an emergency confirm message on a common control channel when the control unit has determined that the notification comprises an emergency.

In some embodiments, the control unit 101 is further arranged to analyse the emergency confirm message by analysing security information in the emergency confirm message to confirm that the emergency confirm message is authentic before the emergency information is displayed. The control unit 101 may also be arranged to display emergency information on an output arrangement 109.

The output arrangement 109 may be a display, a speaker arrangement and/or the like.

In some embodiments, the user equipment is in an idle mode or a connected mode enabled to receive information over the paging channel, such as Idle, Cell PCH state and URA PCH state.

The control unit 101, 201 may comprise a CPU, a single processing unit, a plurality of processing units, and or the like.

The memory unit 107, 207 may comprise a single memory unit, a plurality of memry units, external and/or internal memory units.

Hence embodiments herein disclose a system in a telecommunications network, comprising an arrangement adapted to use a PAGING TYPE 1 message including an Earthquake Tsunami Warning System primary notification on paging control channel to trigger a behaviour of a user equipment. The user equipment is arranged to start receiving messages on common control channel during a predefined period of time, when it has received the ETWS primary notification in the PAGING TYPE 1 message.

Embodiments are described with reference to block diagrams and/or flowchart illustrations of methods, apparatus (systems). It is understood that several blocks of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

In some implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method in a communication device in a cellular telecommunications network, the method comprising the steps of:
receiving an emergency notification from a broadcasting unit, wherein the emergency notification includes a cell identifier for a cell associated with the communication device, wherein a notification indicating an emergency is to be transmitted to a user equipment within the cell;
determining a paging channel to be used to page and broadcast within the cell, the notification indicating the emergency;
ordering the notification indicating the emergency to be transmitted on the paging channel;
determining a common control channel to be used to broadcast an emergency confirm message within the cell, wherein the emergency confirm message includes security information enabling the user equipment to authenticate the emergency confirm message; and
ordering the emergency confirm message to be transmitted on the common control channel.

2. The method according to claim 1, further comprising the step of determining a dedicated channel used by a user equipment being connected over the dedicated channel, and ordering the emergency confirm message to be transmitted on the dedicated channel.

3. The method according to claim 1, wherein the page of the notification indicating the emergency is ordered to be transmitted using a range of 10-70% of a total Secondary Common Control Physical Channel (S-CCPCH) capacity, and a Discontinuous Receiving (DRX) cycle of the cell comprises a time cycle in a range from 0.5 to 2.56 seconds.

4. The method according to claim 1, wherein the emergency confirm message comprises Earthquake and Tsunami Warning System information indicating an emergency and Earthquake and Tsunami Warning System security information.

5. The method according to claim 1, wherein the notification indicating the emergency includes a value indicating that the notification concerns an emergency, said value indicating Earthquake and Tsunami Warning System primary notification information.

6. The method according to claim 1, wherein the emergency confirm message is repeatedly transmitted on the Common Control Channel.

7. The method according to claim 1, wherein the ordering step includes sending an order to a base station to be performed by the base station.

8. The method according to claim 1, wherein the communication device sets up bearers within the cell and transmits the notification indicating the emergency on the paging channel, and transmits the emergency confirm message on the common control channel.

9. A communication device, comprising:
 a first network interface configured to receive an emergency notification from a broadcasting unit over a network; and
 a control unit configured to:
 determine a paging channel to be used to page and broadcast a notification indicating an emergency when the emergency notification is received at the network interface;
 order the notification indicating the emergency to be transmitted on the paging channel;
 determine a common control channel to be used to broadcast an emergency confirm message, wherein the emergency confirm message includes security information enabling a user equipment receiving the message to authenticate the emergency confirm message; and
 order the emergency confirm message to be transmitted on the common control channel.

10. The communication device according to claim 9, wherein the control unit is further configured to create an order of channel determination and transmit the order to a base station over a second network interface.

11. The communication device according to claim 9, wherein the control unit is further configured to:
 order the notification indicating the emergency to be transmitted on the paging channel using a range of 10-70% of a total Secondary Common Control Physical Channel (S-CCPCH) capacity; and
 order that a Discontinuous Receiving cycle (DRC) comprise a time cycle in a range of 0.5 to 2.56 seconds.

12. The communication device according to claim 9, wherein the control unit is further configured to:
 determine a dedicated channel to be used to broadcast the emergency confirm message; and
 order the emergency confirm message to be transmitted on the dedicated channel.

13. The communication device according to claim 9, wherein the emergency confirm message comprises Earthquake Tsunami Warning System information indicating an emergency and Earthquake Tsunami Warning System Security information.

14. The communication device according to claim 9, wherein the notification indicating the emergency includes a value indicating that the notification concerns an emergency, said value indicating Earthquake and Tsunami Warning System primary notification information.

15. The communication device, according to claim 9, wherein the control unit is further configured to order the emergency confirm message to be repeatedly transmitted on the common control channel during primary notification.

16. The communication device according to claim 9, wherein the emergency confirm message comprises a Radio Resource Control emergency message.

17. The communication device according to claim 9, wherein the communication device is further configured to set up bearers within a cell and to transmit the notification indicating the emergency and the emergency confirm message, wherein the communication device comprises an enhanced NodeB.

18. The communication device according to claim 9, comprising a controller functioning node.

19. A method in a user equipment configured to listen to a paging channel within a telecommunications network for receiving a notification indicating an emergency, the method comprising the steps of:
 receiving on the paging channel, the notification indicating the emergency;
 listening to a common control channel as a result of receiving the notification indicating the emergency;
 receiving an emergency confirm message on the common control channel, the emergency confirm message including security information; and
 confirming authenticity of the emergency confirm message utilizing the security information.

20. The method according to claim 19, further comprising the step of displaying emergency information on the user equipment.

21. A User Equipment comprising:
 a receiver configured to receive on a paging channel, a notification indicating an emergency; and
 a control unit configured to:
 read the notification,
 determine that the notification indicates the emergency,
 switch operation of the receiver to enable the receiver to receive an emergency confirm message on a common control channel when the notification indicates the emergency, and
 authenticate the emergency confirm message by analyzing security information included in the emergency confirm message.

22. The User Equipment according to claim 21, wherein the control unit is further configured to display emergency information on a display after the emergency confirm message is authenticated.

23. The user equipment according to claim 21, wherein the user equipment is in an idle mode or a connected mode enabled to receive information over the paging channel.

24. A system in a telecommunications network, comprising:
 a transmitter configured to transmit on a paging control channel, a PAGING TYPE 1 message including an Earthquake Tsunami Warning System primary notification and security information; and
 a user equipment configured to:
 receive the PAGING TYPE 1 message;
 determine that the PAGING TYPE 1 message includes the Earthquake Tsunami Warning System primary notification;
 start receiving associated messages on a common control channel during a predefined period of time, upon determining that the PAGING TYPE 1 message includes the Earthquake Tsunami Warning System primary notification; and
 authenticate the associated messages by analyzing security information included in the associated messages.

* * * * *

UNITED STATES PATENT AND TRADEMARK OFFICE
CERTIFICATE OF CORRECTION

PATENT NO.         : 8,682,282 B2
APPLICATION NO.    : 13/058496
DATED              : March 25, 2014
INVENTOR(S)        : Ekemark et al.

Page 1 of 1

It is certified that error appears in the above-identified patent and that said Letters Patent is hereby corrected as shown below:

In the Specification

In Column 8, Line 65, delete "ETVVS" and insert -- ETWS --, therefor.

In Column 13, Line 26, delete "memry" and insert -- memory --, therefor.

In the Claims

In Column 15, Line 47, in Claim 15, delete "device," and insert -- device --, therefor.

Signed and Sealed this
Ninth Day of September, 2014

Michelle K. Lee
*Deputy Director of the United States Patent and Trademark Office*